United States Patent [19]

Petty et al.

[11] Patent Number: 5,769,033
[45] Date of Patent: Jun. 23, 1998

[54] HOT WATER STORAGE

[75] Inventors: Stephen E. Petty, Dublin, Ohio;
Ronald G. Jones, Indianapolis, Ind.

[73] Assignee: Columbia Gas of Ohio, Inc., Columbus, Ohio

[21] Appl. No.: 589,824

[22] Filed: Jan. 22, 1996

[51] Int. Cl.⁶ .............................. F22B 5/00; H05B 1/02
[52] U.S. Cl. .................... 122/13.1; 122/234; 122/493; 392/322; 126/373
[58] Field of Search .................... 122/13.1–13.2, 122/16, 37, 208, 234, 493; 219/213; 392/322; 126/361, 363, 373

[56] References Cited

U.S. PATENT DOCUMENTS

| | | | |
|---|---|---|---|
| 2,055,500 | 9/1936 | McLeod | 219/213 |
| 2,549,755 | 4/1951 | Burwell | 122/234 |
| 3,495,276 | 2/1970 | Suess | 4/1 |
| 3,999,709 | 12/1976 | Estabrook | 237/8 R |
| 4,398,529 | 8/1983 | Schoenfelder | 126/436 |
| 4,551,612 | 11/1985 | Sprague | 219/312 |
| 4,567,350 | 1/1986 | Todd | 219/298 |
| 4,685,445 | 8/1987 | Seidel | 126/434 |
| 5,201,432 | 4/1993 | Elvin-Jensen | 220/1.5 |
| 5,247,908 | 9/1993 | Williamson | 122/13.2 |
| 5,479,558 | 12/1995 | White et al. | 392/485 |
| 5,596,952 | 1/1997 | Lannes et al. | 122/13.1 |

Primary Examiner—William Doerrler
Attorney, Agent, or Firm—Philip M. Dunson; Philip J. Pollick

[57] ABSTRACT

Apparatus for heating and storing water comprises a tank 10 for holding a quantity of water 15 within a space 11 between studs 12 in a wall or like surface 13 of a room 14. An inlet conduit 16 conveys water into the tank 10, and an outlet conduit 17 conveys water out of it and on to another entity 36. A heater 32, spaced apart from the tank 10, receives water from a supply source at a lower temperature, heats it to a higher temperature, and communicates the heated water to the inlet conduit 16. Reinforcing structural members 25 and locator tabs 22 allow for economic construction and ease of installation. A typical tank 10 comprises a hollow parallelopiped having its front surface member 20 in the plane of the surface 13 of the room 14 and its back surface in a plane behind that of the surface 13.

21 Claims, 3 Drawing Sheets

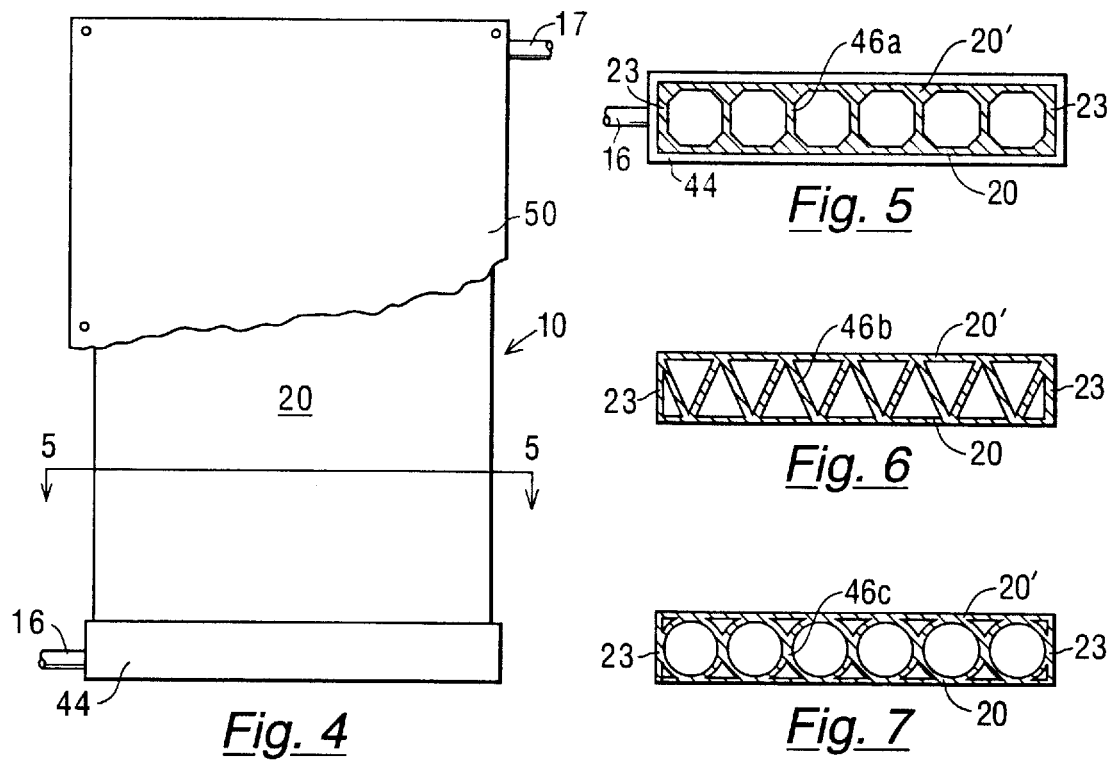
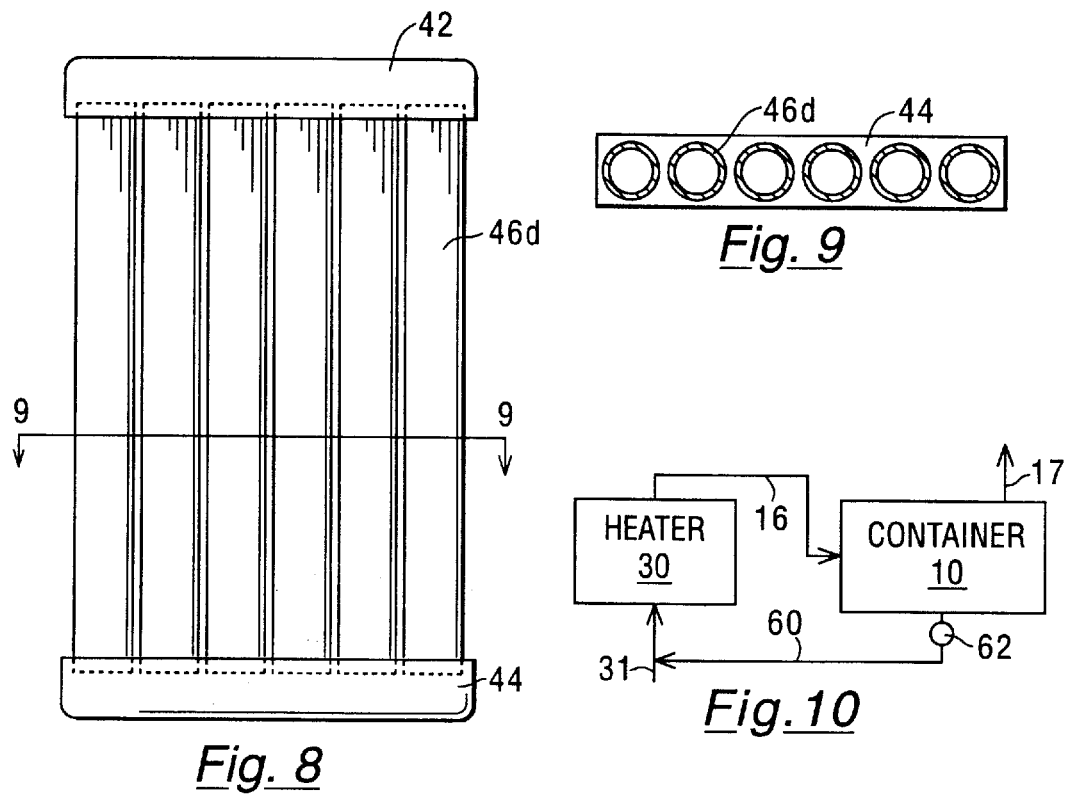

HOT WATER STORAGE

FIELD

This invention relates to apparatus for heating and storing water. It has to do particularly with such apparatus wherein the burner is separate from the hot water tank. The tank typically is made of moldable material, for convenient placement in walls, ceilings, or the like. Hot water heating and storage installations according to the invention are especially useful and attractive for use in apartments and small homes where living space is at a premium.

BACKGROUND

Of interest and connection with the present invention are the U.S. Pat. Nos. 4,551,612 of Sprague and 5,247,908 of Williamson. The patent of Sprague is one of the first in which an electrically heated hot water tank is located between vertical studs in a home or other building. The tank typically is hidden behind drywall. The Williamson patent also relates to a simple electrically heated hot water heater that is placed within the framing of a dwelling. In both Sprague and Williamson, the electrical heating elements are inside the storage tank.

In the apparatus of the present invention the heating element is separate from the storage tank. So the tank is not subjected to the higher temperatures that are present there when the heating element is within the tank, as in the Sprague and Williamson patents; and the tanks in the present invention typically last longer. Locating the heating chamber apart from the tank also makes the heating element more convenient to adjust and to service.

DISCLOSURE

Typical apparatus according to the present invention for heating and storing water comprises a container for holding a quantity of the water. At least a portion of the container is held in place within a space between elongate structural members in a wall, ceiling, floor, or like room surface in a building. An inlet conduit conveys water into the container, and an outlet conduit conveys water out of the container. Heating means spaced apart from the container receives water at a lower temperature, heats the water to a higher temperature, and communicates the heated water to the inlet conduit.

A supply conduit furnishes water at the lower temperature from a source of supply thereof to the heating means. So the water is furnished to the container at substantially the higher temperature, and is made available to another entity, via the outlet conduit, at a temperature above the lower temperature. Exterior locating tabs are attached to the container to facilitate quick and easy installation with respect to the structural members. Interior surface support members provide container integrity under increasing pressure.

The container typically comprises a hollow parallelopiped having a front surface member in, or in the close vicinity of, the plane of the room surface, with the lengthwise direction of the front surface member substantially in the lengthwise direction of the adjacent structural members, and the widthwise direction of the front surface member substantially perpendicular thereto. Typically tabs extend from the front surface member outwardly in the widthwise direction, and each tab is attached to the adjacent structural member.

The container typically comprises also a back surface member similar and parallel to the front surface member at a distance substantially less than the length and substantially less than the width of each said surface member; a pair of planar side surface members, each connecting a lengthwise edge of the front surface member with the near lengthwise edge of the back surface member; a pair of planar end surface members, each connecting a widthwise edge of the front surface member with the near widthwise edge of the back surface member; and a surface-supporting member therein, substantially spaced from the side surface members and the end surface members, attached at one end to the front surface member and at the other end to the back surface member, to aid in maintaining substantially the same spacing between the front and back surface members in at least a major portion thereof. The container typically comprises also additional spaced apart surface-supporting members therein, each attached at one end to the front surface member and at the other end to the back surface member, to aid further in maintaining substantially the same spacing between the said front and back surface members in areas thereof that are substantially spaced from the side surface members and the end surface members.

The container typically is made of metal, plastic, ceramic, or other water-impervious material. In some typical containers the metal is a sheet metal lined with lining material such as a plastic, ceramic (e.g., glass), or composite material. In others a composite material is used that contains metal, glass, plastic, carbon, or other reinforcing material.

Typically the heating means comprises a fuel-burning or electric heater positioned adjacent to a heat-receiving conduit that conveys water from the water-supplying conduit to the inlet conduit and transfers heat from the heater to the water flowing through the heat-receiving conduit. The heat-receiving conduit typically surrounds at least a major portion of the outer surface of the heater, as where the heater comprises an elongate substantially cylindrical heated outer surface and the heat-receiving conduit comprises approximately a helix adjacent thereto.

Other typical features are described in the section on carrying out the invention.

DRAWINGS

FIG. 3 illustrates how the tanks appear when mounted in a horizontal part of a building, as in a floor or a ceiling.

FIG. 4 is a schematic front view of a typical hot water storage tank for use in the present invention, comprising a manifold at each end and longitudinally connecting conduits for conveying water between the manifolds.

FIG. 5 is a sectional view taken in the plane 5—5 of FIG. 4, showing the cross-sectional shapes of typical longitudinal conduits in the tank.

FIG. 6 is a view similar to FIG. 5, showing the cross-sectional shapes of other typical longitudinal conduits in the tank.

FIG. 7 is a view similar to FIGS. 5 and 6, showing the cross-sectional shapes of still other typical longitudinal conduits in the tank.

FIG. 8 is a schematic front view similar to FIG. 4, illustrating somewhat similar typical embodiments of a water storage tank for use in the invention; but wherein the longitudinal conduits for conveying water between the manifolds comprise cylindrical members that are separate from each other. Also the front, back, and side walls of FIGS. 4–7 are not needed.

FIG. 9 is a sectional view taken in the plane 9—9 of FIG. 8, showing a typical arrangement, and cross-sectional shapes, of the cylindrical longitudinally connecting conduits.

FIG. 10 is a schematic block diagram of typical apparatus as in FIG. 1—9 comprising additional optional components.

CARRYING OUT THE INVENTION

Figure 1:
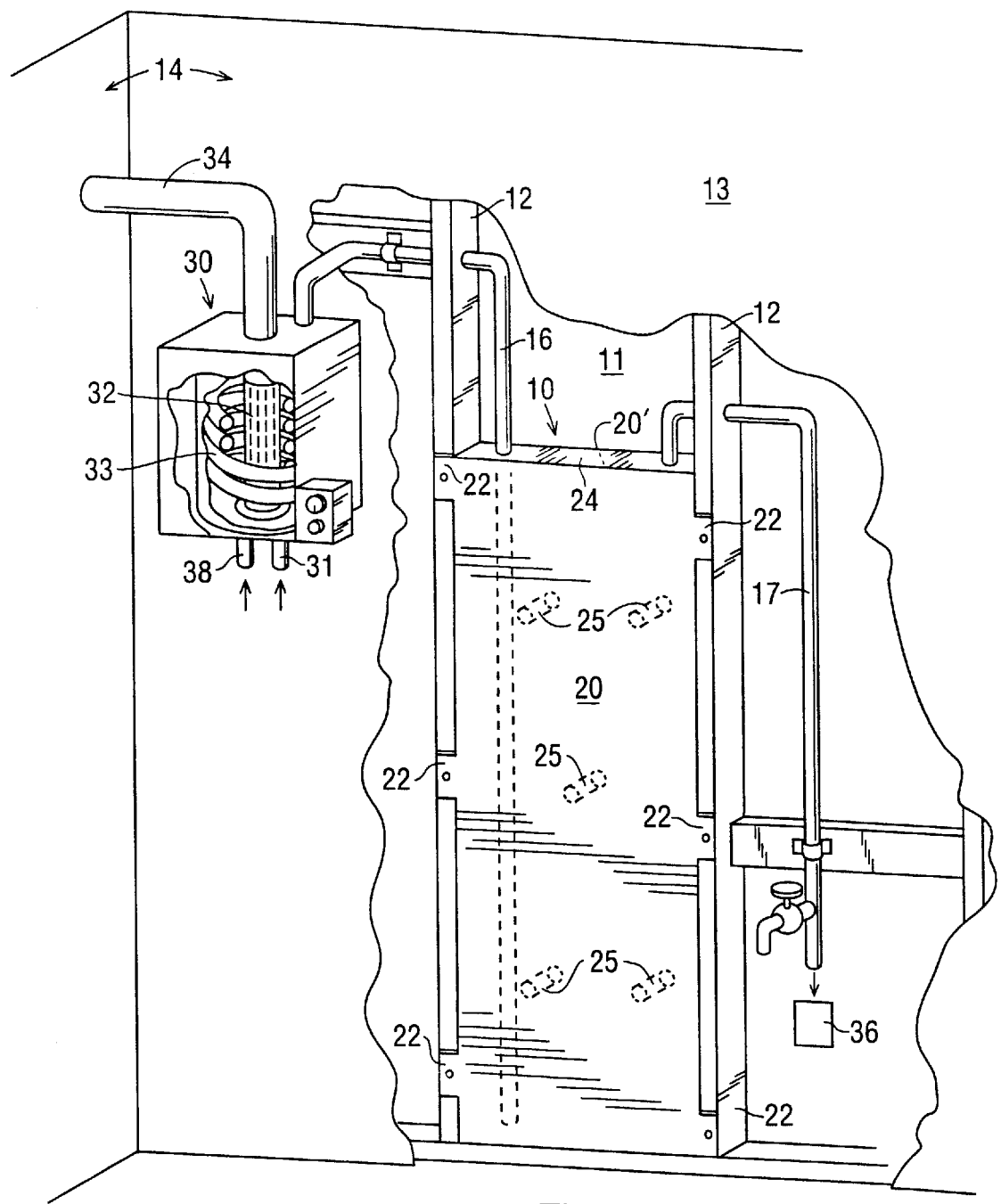
FIG. 1 is a schematic front perspective view, with portions cut away, of typical apparatus according to the present invention mounted between vertical studs in the wall structure of a building.

Referring now to FIG. 1, typical apparatus according to the present invention for heating and storing water, comprises container means 10 for holding a quantity of water 15;

at least a portion of the container means 10 being held in place within a space 11 between elongate structural members 12 in a wall, ceiling, floor, or like surface 13 of a structure 14;

inlet conduit means 16 for conveying water into the container means 10;

outlet conduit means 17 for conveying water out of the container means 10;

heating means 30, spaced apart from the container means 10, for receiving water at a lower temperature, heating the water to a higher temperature, and communicating the heated water to the inlet conduit means 16 of the container 10; and supply conduit means 31 for furnishing water at the lower temperature from a source of supply thereof to the heating means 30;

so constructed and arranged that the water is furnished to the container means 10 at substantially the higher temperature, and made available to another entity 36, via the outlet conduit means 17, at a temperature above the lower temperature. One or more exterior tabs 22 extend from the container for attachment to at least one of the structural members 12. One or more interior surface support members 25 provide container integrity at increasing pressure or temperature or both.

The container means 10 typically comprises substantially a hollow parallelopiped having a front surface member 20 in or in the close vicinity of the plane of the surface 13 of the structure 14; the lengthwise direction of the front surface member 20 being substantially in the lengthwise direction of the adjacent structural members 12, and the widthwise direction of the front surface member 20 being substantially perpendicular thereto. The front surface member 20 typically includes tabs 22 extending therefrom in the widthwise direction, each said tab 22 being attached to the adjacent structural member 12.

Typical container means 10 comprises also a back surface member 20' substantially parallel to the front surface member 20 at a distance substantially less than the length and substantially less than the width of each said surface member 20,20';

a pair of planar side surface members 23, each connecting a lengthwise edge of the front surface member 20 with the near lengthwise edge of the back surface member 20';

a pair of planar end surface members 24, each connecting a widthwise edge of the front surface member 20 with the near widthwise edge of the back surface member 20'; and a surface-supporting member 25 therein, substantially spaced apart from the side surface members 23 and the end surface members 24, attached at one end to the front surface member 20 and at the other end to the back surface member 20', to aid in maintaining substantially the same spacing between the said front and back surface members 20,20' in at least a major portion thereof.

The apparatus typically comprises also a plurality of additional spaced apart surface-supporting members 25 therein, each said member 25 being attached at one end thereof to the front surface member 20 and at the other end to the back surface member 20', to aid further in maintaining substantially the same spacing between the said front and back surface members 20,20' in areas thereof that are substantially spaced from the side surface members 23 and the end surface members 24.

The surface members 20,20',23,24 typically may comprise metal, plastic, ceramic, or other water-impervious material. Typical metal material comprises sheet metal that is lined with a lining of plastic, ceramic, or composite material. Typical useful ceramics include glass products of various types. Other typical container material includes composites that comprise metal, glass, plastic, carbon, or other reinforcing material.

Typical heating means 30 comprises a fuel-burning or electric heater 32 positioned adjacent to heat-receiving conduit means 33 for conveying water from the water-supplying conduit means 31 to the inlet conduit means 16 and transferring heat from the heater 32 to the water flowing through the heat-receiving conduit means 33, which substantially surrounds at least a major portion of the outer surface of the heater 32. Typically the heater 32 comprises an elongate substantially cylindrical heated outer surface and the heat-receiving conduit means 33 comprises approximately a helix adjacent to said outer surface.

Typical useful fuels for a fuel-burning heater 32 include natural gas, propane, LP6, gasoline, diesel fuels, kerosene, number 6 fuel oil, and the like. The conduit 38 conveys the fuel to the heater 32, and waste combustion products are removed through a vent 34. Alternatively, where the heating means 30 comprises an electric heater 32 it may be connected via wires inside the conduit 38 that continue on to an electrical supply.

Referring now especially to FIGS. 4 and 8, in some typical apparatus according to the invention, the container means 10 has a first manifold 42 at one end, a second manifold 44 at the other end, and longitudinally connecting conduits 46a, 46b, 46c, or 46d for conveying water between the manifolds 42 and 44. As shown in FIG. 5, the conduits 46a typically comprise octagons or other many sided polygons, in cross section; as shown in FIG. 6, the conduits 46b typically are triangular in cross section; and as shown in FIG. 7, the conduits 46c typically are circular in cross section. Typically, as in FIGS. 8 and 9, the longitudinal conduits 46d are spaced apart and are cylindrical.

The surface-supporting members 25 in FIG. 1 and the longitudinally connecting conduits 46a, 46b, 46c, 46d in FIGS. 4–9 are employed as shown to strengthen the container means 10 and minimize the thickness of the front, back, side, and end surface members 20, 20 , 23, 24. Typically the container means 10 are designed to keep the amount, weight, and costs of materials, as well as manufacturing expense, as low as possible while complying with all applicable building codes and related requirements.

Figure 2:
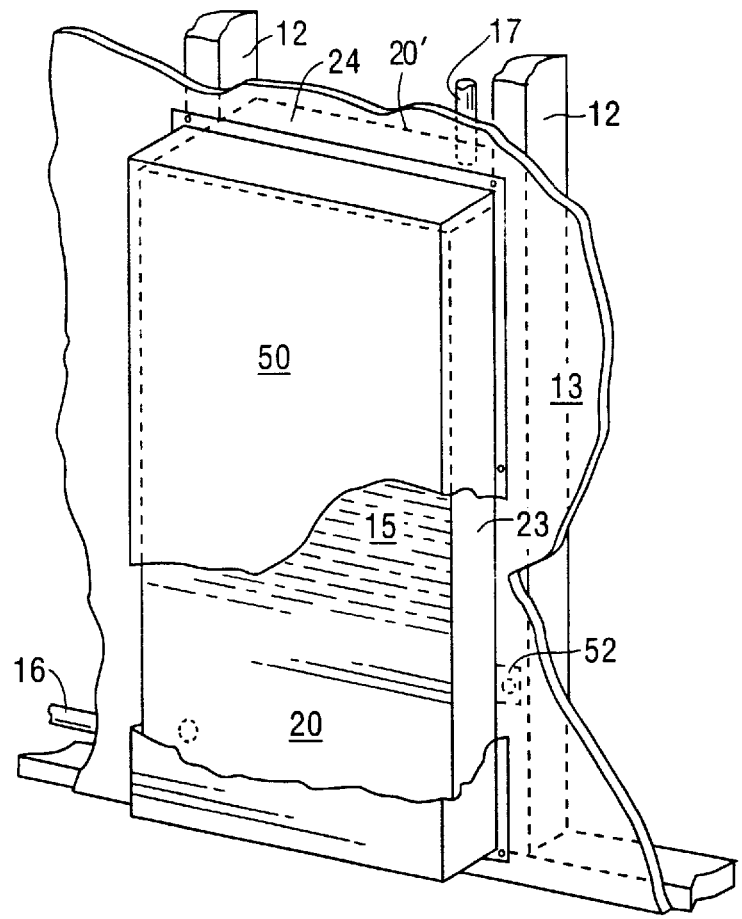
FIG. 2 is a similar view of another typical tank for use in the present invention.

The apparatus may further comprise cover means 50, as in FIG. 2 and 4, for the container means 10. The cover means 50 typically comprises insulating material.

Figure 3:
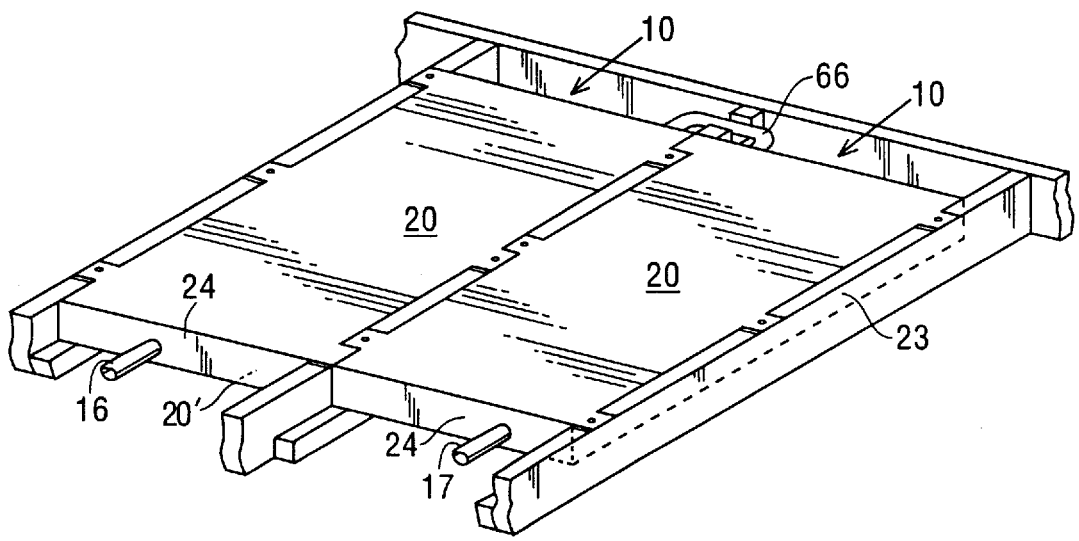
FIG. 3 is a perspective view, somewhat similar to FIGS. 1 and 2, in which a plurality of water storage tanks for use in the present invention are connected in series.

For increased storage capacity, a plurality of container means 10 may be included in the apparatus. Typically they are connected in series, as shown by an intermediate conduit 66 in FIG. 3.

As illustrated in FIG. 10, the apparatus, where so desired, may further comprise recirculating conduit means 60 and thermostatic valve means 62 for conveying water between the container means 10 and the heating means 30.

In some typical embodiments of the invention, as illustrated in FIG. 2, the container means 10 comprises substantially a hollow parallelopiped having a front surface member 20 in a plane spaced in a first direction (e.g. into the room 14) from, and substantially parallel to, the plane of the surface 13 of the structure 14;

- the lengthwise direction of the front surface member 20 being substantially in the lengthwise direction of the adjacent structural members 12, and the widthwise direction of the front surface member 20 being substantially perpendicular thereto;
- a back surface member 20' substantially parallel to the front surface member 20 at a distance substantially less than the length and less than the width of said front and back surface members 20,20';
- the back surface member 20' being in a plane spaced from the plane of the surface 13 of the structure 14 in a second direction (e.g. into the space 11 between two studs 12) that is opposite to the first direction;
- a pair of planar side surface members 23, each connecting a lengthwise edge of the front surface member 20 with the near lengthwise edge of the back surface member 20';
- a pair of planar end surface members 24, each connecting a widthwise edge of the front surface member 20 with the near widthwise edge of the back surface member 20'; and
- at least one surface-supporting member 25 therein, each said member 25 being attached at one end thereof to the front surface member 20 and at the other end to the back surface member 20' to aid in maintaining substantially the same spacing between the said front and back surface members 20,20' in areas thereof that are substantially spaced from the side surface members 23 and the end surface members 24.

In such embodiments, each side surface member 23 typically includes at least one tab 52 extending therefrom in the widthwise direction, each tab 52 being attached to the adjacent structural member 12.

The parallelopiped shape is generally preferred for the container means 10, especially for use in walls. Less expensive shapes may be appropriate, however, for some locations, especially in ceilings.

While the forms of the invention herein disclosed constitute currently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. Apparatus for heating and storing water, comprising container means for holding a quantity of water;
   at least a portion of the container means being held in place within a space between elongate structural members in a wall, ceiling, floor, or like surface of a structure;
   inlet conduit means for conveying water into the container means;
   outlet conduit means for conveying water out of the container means;
   heating means, spaced apart from the container means, for receiving water at a lower temperature, heating the water to a higher temperature, and communicating the heated water to the inlet conduit means of the container; and
   supply conduit means for furnishing water at the lower temperature from a source of supply thereof to the heating means;
   so constructed and arranged that the water is furnished to the container means at substantially the higher temperature, and made available to another entity, via the outlet conduit means, at a temperature above the lower temperature.

2. Apparatus as in claim 1, wherein
   the container means comprises substantially a hollow parallelopiped having a front surface member in or in the close vicinity of the plane of the surface of the structure;
   the lengthwise direction of the front surface member being substantially in the lengthwise direction of the adjacent structural members, and the widthwise direction of the front surface member being substantially perpendicular thereto.

3. Apparatus and as in claim 2, wherein the front surface member includes tabs extending therefrom in the widthwise direction, each said tab being attached to the adjacent structural member.

4. Apparatus as in claim 2, wherein the container means comprises also
   a back surface member substantially parallel to the front surface member at a distance substantially less than the length and substantially less than the width of each said surface member;
   a pair of planar side surface members, each connecting a lengthwise edge of the front surface member with the near lengthwise edge of the back surface member;
   a pair of planar end surface members, each connecting a widthwise edge of the front surface member with the near widthwise edge of the back surface member; and
   a surface-supporting member therein, substantially spaced apart from the side surface members and the end surface members, attached at one end to the front surface member and at the other end to the back surface member, to aid in maintaining substantially the same spacing between the said front and back surface members in at least a major portion thereof.

5. Apparatus as in claim 4, comprising also a plurality of additional spaced apart surface-supporting members therein, each said member being attached at one end thereof to the front surface member and at the other end to the back surface member, to aid further in maintaining substantially the same spacing between the said front and back surface members in areas thereof that are substantially spaced from the side surface members and the end surface members.

6. Apparatus as in claim 1, wherein the container comprises metal, plastic, ceramic, or other water-impervious material.

7. Apparatus as in claim 6, wherein the metal is a sheet metal that is lined with a lining of plastic, ceramic, or composite material.

8. Apparatus as in claim 6, wherein the metal, plastic, ceramic, or other water-impervious material is formed as a composite comprising glass, plastic, carbon, or other reinforcing material.

9. Apparatus as in claim 1 further comprising one or more exterior tabs extending from said container for attachment to at least one of the structural members.

10. Apparatus as in claim 1 further comprising one or more interior supporting members attached to one or more interior surfaces of container.

11. Apparatus as in claim 1, wherein the heating means comprises a fuel-burning or electric heater positioned adjacent to heat-receiving conduit means for conveying water from the water-supplying conduit means to the inlet conduit means and transferring heat from the heater to the water flowing through the heat-receiving conduit means.

12. Apparatus as in claim 11, wherein the heat-receiving conduit means substantially surrounds at least a major portion of the outer surface of the heater.

13. Apparatus as in claim 12, wherein the heater comprises an elongate substantially cylindrical heated outer surface and the heat-receiving conduit means comprises approximately a helix adjacent to said outer surface.

14. Apparatus as in claim 1, wherein the container means has a first manifold at one end, a second manifold at the other end, and longitudinally connecting conduits for conveying water between the manifolds.

15. Apparatus as in claim 14, wherein the longitudinal conduits are spaced apart.

16. Apparatus as in claim 15, wherein the longitudinal conduits are cylindrical.

17. Apparatus as in claim 1, further comprising cover means for the container means.

18. Apparatus as in claim 17, wherein the cover means comprises insulating material.

19. Apparatus as in claim 1, further comprising recirculating conduit means and thermostatic valve means for conveying water between the container means and the heating means.

20. Apparatus as in claim 1, wherein the container means comprises substantially a hollow parallelopiped having a front surface member in a plane spaced in a first direction from, and substantially parallel to, the plane of the surface of the structure;

the lengthwise direction of the front surface member being substantially in the lengthwise direction of the adjacent structural members, and the widthwise direction of the front surface member being substantially perpendicular thereto;

a back surface member substantially parallel to the front surface member at a distance substantially less than the length and less than the width of said front and back surface members;

the back surface member being in a plane spaced from the plane of the surface of the structure in a second direction that is opposite to the first direction;

a pair of planar side surface members, each connecting a lengthwise edge of the front surface member with the near lengthwise edge of the back surface member;

a pair of planar end surface members, each connecting a widthwise edge of the front surface member with the near widthwise edge of the back surface member; and at least one surface-supporting member therein, each said member being attached at one end thereof to the front surface member and at the other end to the back surface member to aid in maintaining substantially the same spacing between the said front and back surface members in areas thereof that are substantially spaced from the side surface members and the end surface members.

21. Apparatus as in claim 20, wherein each side surface member includes at least on tab extending therefrom in the widthwise direction, each tab being attached to the adjacent structural member.

* * * * *

UNITED STATES PATENT AND TRADEMARK OFFICE
CERTIFICATE OF CORRECTION

PATENT NO. : 5,769,033
DATED : June 23, 1998
INVENTOR(S) : Petty et al.

It is certified that error appears in the above-indentified patent and that said Letters Patent is hereby corrected as shown below:

Column 4, line 60, delete "members 20, 20 , 23, 24." and insert therefor

- - members 20, 20', 23, 24. - -.

Column 6, line 27, delete "3. Apparatus and as in" and insert therefor

- - 3. Apparatus as in - -.

Signed and Sealed this

Thirteenth Day of October 1998

Attest:

BRUCE LEHMAN

Attesting Officer

Commissioner of Patents and Trademarks